United States Patent [19]
Gumery et al.

[11] Patent Number: 5,435,710
[45] Date of Patent: Jul. 25, 1995

[54] DEVICE FOR SENDING A COATING MATERIAL UNDER HIGH PRESSURE INTO A MOLD

[75] Inventors: Xavier Gumery, La Garenne; Guy Marot, Lys Lez Lannoy; Albin Rey, St. Cloud, all of France

[73] Assignee: Getrasur, Presle-En-Brie, France

[21] Appl. No.: 29,734

[22] Filed: Mar. 11, 1993

[30] Foreign Application Priority Data

Mar. 11, 1992 [FR] France .................. 92 02903

[51] Int. Cl.⁶ .................. B29C 43/18; B29C 45/14
[52] U.S. Cl. .................. 425/129.1; 264/255; 264/328.8; 264/328.19; 425/558; 425/559; 425/562
[58] Field of Search .................. 264/328.6, 134, 135, 264/254, 255, 328.7, 328.8, 328.19; 425/128.1, 546, 558, 559, 562

[56] References Cited

U.S. PATENT DOCUMENTS 4,076,788 2/1978 Ditto .
4,720,364 1/1988 Kauffman et al. .
5,011,399 4/1991 Farrell .

FOREIGN PATENT DOCUMENTS 0113222 7/1984 European Pat. Off. .
0197496 10/1986 European Pat. Off. .
1206296 2/1960 France .
59-199226 11/1984 Japan .

Primary Examiner—Mathieu D. Vargot
Attorney, Agent, or Firm—Young & Thompson

[57] ABSTRACT

A method and apparatus for sending a coating material (C) under high pressure into an openable mold (2, 3) which is closed and filled with a moldable material. A chamber (6) is used having one end (7) open toward the inside of the mold and an injection duct (14) emerging in the chamber (6). A piston (38) which can move in the chamber (6) from a first position in which the piston blocks the open end (7) of the chamber, is moved as far as a second position beyond the injection duct (14) in relation to the open end (7) of the chamber. The coating material (C) is injected into the chamber (6) via the injection duct (14) under a first pressure (P0); and with the mold remaining completely closed, the piston (38) is moved toward the first position by applying thereto a force (F2) corresponding, inside the chamber (6), to a second pressure (P2) which is greater than the first pressure (P0). Only thereafter is the mold (2, 3) opened.

2 Claims, 4 Drawing Sheets

FIG_1

DEVICE FOR SENDING A COATING MATERIAL UNDER HIGH PRESSURE INTO A MOLD

FIELD OF THE INVENTION

The present invention relates to a method for sending a coating material under high pressure into a mold, as well as a device which can be used for implementing this method.

BACKGROUND OF THE INVENTION

The invention relates more particularly to a dressing or finishing coating formed in situ on a molded article, that is to say inside its mold before separating the elements of the mold and extracting the article therefrom. Such a method for forming a coating is described in U.S. Pat. No. 4,668,460. A high pressure (several hundreds of bar) is necessary for sending the material of the coating between the mold and the article and ensuring a regular distribution of the coating on the surface of the article. The material enters the mold via a cylindrical chamber in which slides a rod forming an obstructor. When the rod is retracted, the chamber communicates with an injection circuit comprising pumps delivering the material at the desired high pressure. One drawback of this technique is that, short of limiting the pressures which can be used, it is necessary to give the chamber and the injection circuit a very robust structure which is therefore expensive.

U.S. Pat. No. 4,668,460 indicates that the above technique can be used for applying a coating material consisting of a mixture of two or more reactive components. The previously mixed components are injected via the same injection circuit. However, in order to save time when carrying out the method and therefore improving the productivity of the equipment, it would be desirable to be able to mix the components at the same time as the injection.

Another technique is indeed known in which a mixing head emerges directly towards the inside of the mold in order to mix and inject the components simultaneously. The head must, however, necessarily comprise orifices of small cross section in order to guarantee intimate mixing of the components, which limits the pressures which can be used in practice. Furthermore, this second technique requires division of the injection circuit delivering the high pressure.

OBJECTS OF THE INVENTION

A principal aim of the present invention is to provide a method and a device which overcomes the above drawbacks and which makes it possible to use high pressures in order to send the coating material into the mold without substantially increasing the complexity or the cost of the equipment.

Another aim of the invention is for the method to be applicable in a simple manner in the case of a coating material obtained from several components.

SUMMARY OF THE INVENTION

The invention thus provides a method for sending a coating material under high pressure into a mold, in which a chamber is used having one end open towards the inside of the mold and an injection duct emerging in the chamber, and which comprises the following series of steps:

moving a piston which can move in the chamber from a first position in which the piston blocks the open end of the chamber, as far as a second position beyond the injection duct in relation to the open end of the chamber;

injecting the coating material into the chamber via the injection duct under a first pressure; and moving the piston towards said first position by applying thereto a force corresponding, inside the chamber, to a second pressure which is greater than said first pressure.

Thus, only the chamber and the piston need be designed in order to withstand the second pressure applied in order to send the material into the mold. Upstream of the chamber, the pressures exerted are lower and the corresponding equipment may therefore be simpler and less expensive. Furthermore, by reducing the number of zones exposed to the highest pressure, the conditions of safety in the vicinity of the installation are improved.

In a preferred version of the method, in which the coating material consists of a mixture of at least two components, the two components are mixed during the injection step by converging several fluxes respectively containing the components, under said first pressure.

The simultaneous mixing and injection of the components makes it possible to carry out the method in a relatively short time. It is then possible to adjust the first pressure in order to obtain a homogeneous mixture of the reactive components under optimum conditions, while the second pressure is calculated in order to obtain the best distribution of the material in the mold after the mixing.

The second aspect of the invention relates to a device for sending a coating material under high pressure into a mold, comprising a chamber having one end open towards the inside of the mold and injection means for injecting the coating material into the chamber, these injection means including an injection duct emerging in the chamber, and which furthermore comprises a piston which can move in the chamber between a first position in which the piston blocks the open end of the chamber and a second position beyond the injection duct in relation to the free end of the chamber, wherein the injection means are adapted in order to inject the coating material into the chamber under a first pressure, and wherein means for actuating the piston are provided in order to move the piston in the direction going from said second position to said first position with a force corresponding, inside the chamber, to a second pressure which is greater than said first pressure.

This device is designed for implementing the method explained herein above.

BRIEF DESCRIPTION OF THE DRAWINGS

Other characteristics and advantages of the present invention will emerge from the following description of a preferred and non-limiting embodiment, read in conjunction with the attached drawings, in which.

DETAILED DESCRIPTION OF THE INVENTION

Figure 1:
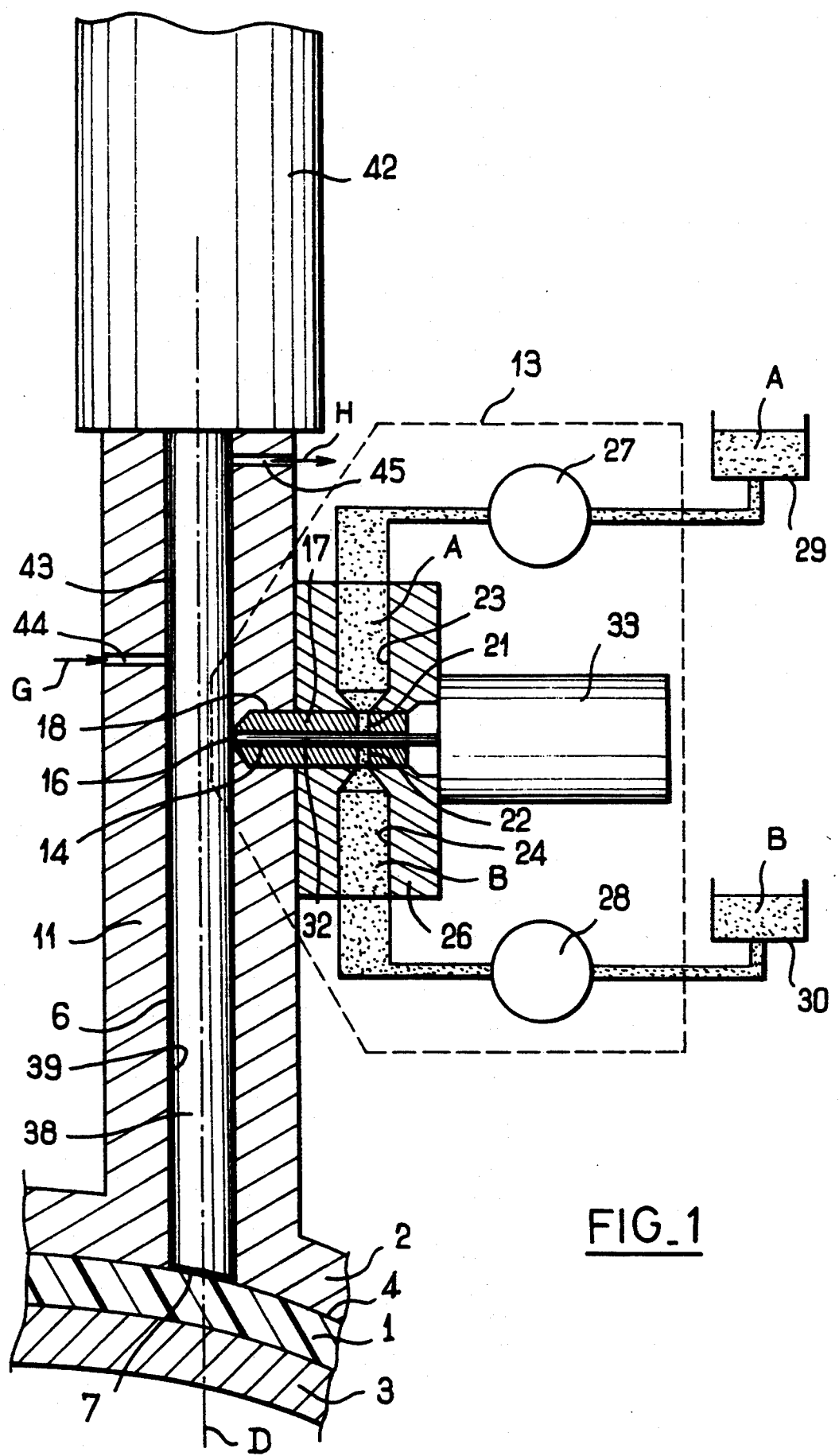
FIGS. 1 to 4 are diagrammatic sectional views of a device according to the invention, represented at various stages of the method according to the invention.

The device represented in FIGS. 1 to 4 is used for sending a coating material into a mold 2, 3 in which an article 1 has previously been formed. The mold is composed of two elements 2, 3 defining between them a cavity. In order to make the article 1 and to prepare in for the application of the coating, the thermosetting material of the article to be molded is placed in the cavity of the mold, the mold elements 2, 3 are pressed towards each other in order to shape the article 1, then a known heat treatment is applied to the article 1 in order to harden it at least partially and in order to make its surface 4 receptive to the coating to be applied.

As explained in U.S. Pat. No. 4,668,460, the coating is applied onto the article 1 by sending the material of the coating under high pressure (typically several hundreds of bars) into the mold and without previously separating the mold elements 2, 3. This operation is performed by implementing the present invention.

The coating material used, for example intended to form a dressing or painting layer on a bodywork article, may consist of a single substance or of a mixture of several reactive components. In the preferred examples described herein below, the coating material C consists of a mixture of two components A, B.

The device according to the invention comprises a chamber 6 which, in the example represented, consists of a cylindrical channel of axis D formed in the upper mold element 2. The chamber 6 has a lower end 7 which is open towards the cavity formed inside the mold.

The device according to the invention comprises injection means, given the overall reference number 13 in FIG. 1, for injecting the material of the coating into the chamber 6. These injection means 13 comprise a cylindrical injection duct 14, which is transverse to the axis D of the chamber, having an end 16 open towards the inside of the chamber 6. The injection duct 14 is formed in a cylindrical article 17 whose front part is installed in a leaktight manner in an opening 18 made in the wall 11 of the chamber 6. Behind the wall 11, this cylindrical article 17 comprises two diametrically opposite orifices 21, 22 which emerge in the injection duct 14. On the opposite side from the injection duct 14, each orifice 21, 22 communicates with a respective cavity 23, 24 formed in an element 26. The element 26 is mounted in a leaktight manner around the rear part of the cylindrical article 17, and is fixed by means, not shown, to the wall 11 of the chamber 6.

The injection means 13 furthermore comprise pumping means comprising, for each component A, B of the coating material, a metering pump 27, 28 whose intake is connected to a tank 29, 30 of said component, and whose output is connected to a respective cavity 23, 24 of the element 26 and to the corresponding orifice 21, 22. The metering pumps 27, 28 used are adapted for delivering each component A, B through the corresponding orifice 21, 22 under a first predetermined pressure P0. The pressure P0 is for example of the order of 15 MPa (150 bar).

The injection means 13 also comprise means for blocking the injection duct, comprising a needle 32 which slides in the injection duct 14 and an actuator such as a hydraulic jack 33 connected to the needle 32. The needle 32 is mounted in the duct 14 with substantially zero clearance so as to produce a seal by simple contact between the periphery of the needle 32 and the wall of the duct 14.

Figure 2:
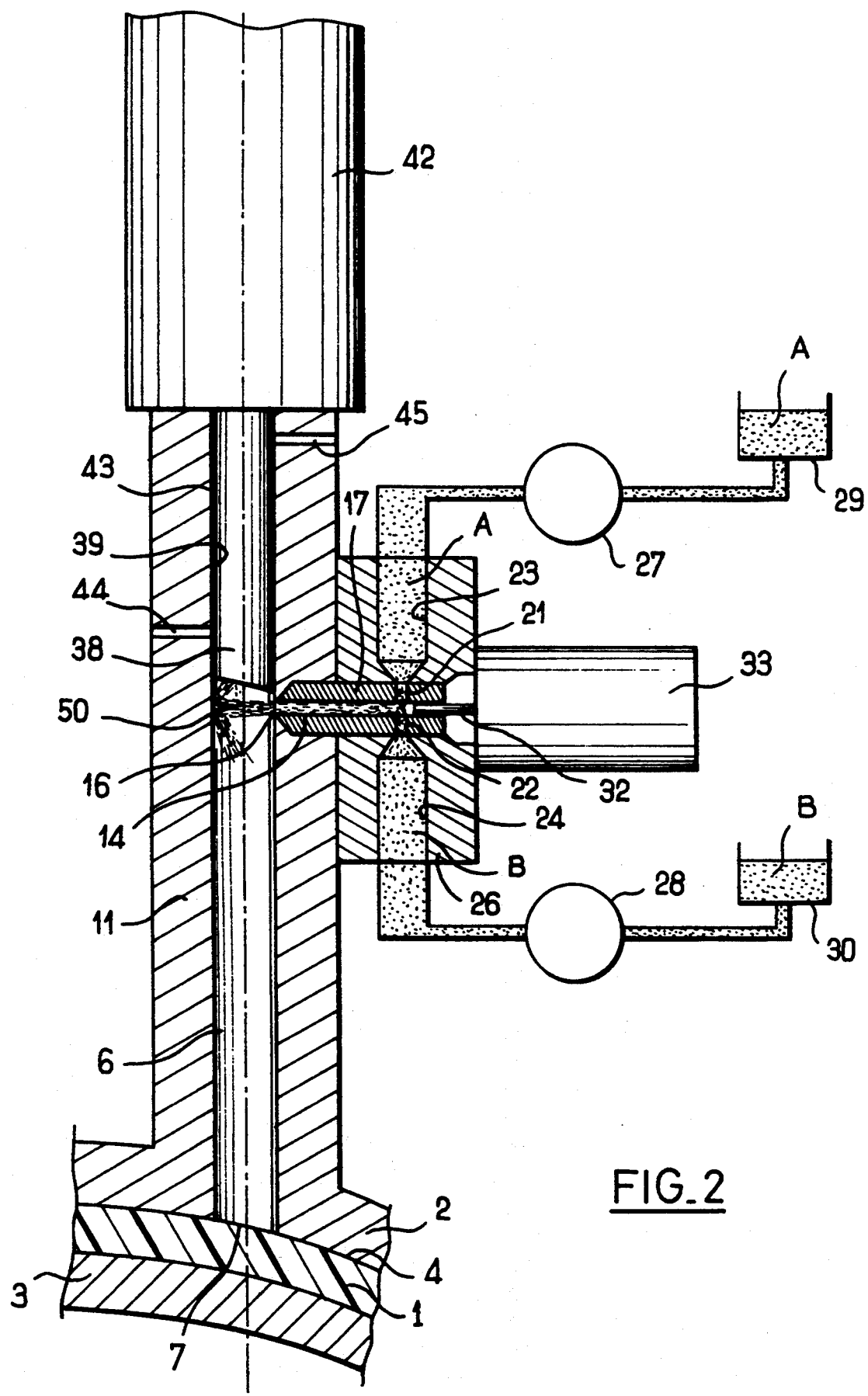

The needle 32 can move in the injection duct 14 between a blocking position in which it blocks both the end 16 of the duct 14 which is open towards the chamber 6 and the two orifices 21, 22 (FIGS. 1, 3 and 4), and a position of a retraction beyond the orifices 21, 22 in relation to the open end 16 (FIG. 2). The jack 33 is chosen so that it can control the movement of the needle 32 in both directions between these two positions with a force F1 which is sufficient to overcome the pressure P0 exerted at the orifices 21, 22. The jack 33 may, for example, actuate the needle 32 with a force $F1 = P1 \times S1$ corresponding, inside the injection duct 14, to a pressure P1 of the order of 20 MPa (200 bar) which is greater than the pressure P0, S1 denoting the internal cross-sectional area of the duct 14.

A cylindrical piston 38 is mounted so as to slide parallel to the axis D in the chamber 6. The chamber 6 and the piston 38 are arranged so that the direction D of sliding of the piston is substantially vertical, with the end 7 of the chamber 6 directed downward. The piston 38 has an external cross section substantially identical to the internal cross section of the chamber 6. There is a clearance only of the order of 1 or 2 microns between the periphery 39 of the piston 38 and the wall 11 of the chamber 6, which makes it possible to make a seal by simple contact around the piston 38 which can move in the chamber 6.

Figure 3:
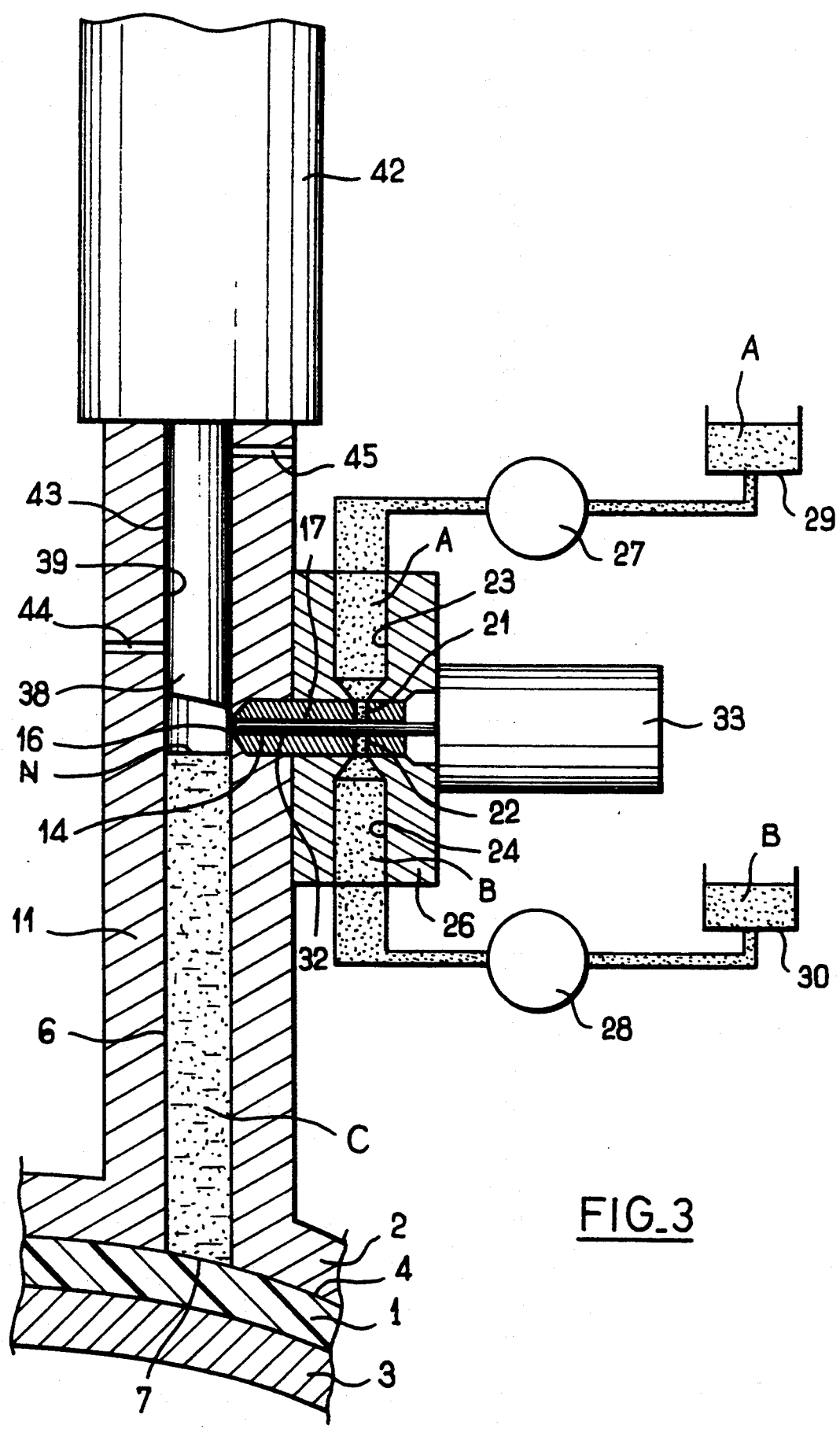

The piston 38 can move in the chamber between a first position in which it blocks the end 7 of the chamber 6 which is open towards the inside of the mold (lower position represented in FIGS. 1 and 4) and a second position beyond the injection duct 14 in relation to the open end 7 of the chamber (retracted upper position represented in FIGS. 2 and 3).

Actuation means such as a hydraulic jack 42 are connected to the piston 38 in order to control the movement of the piston 38 in both directions between these two positions. In the direction going from the upper position to the lower position, the jack 42 may push the piston 38 with a force $F2 = P2 \times S2$ corresponding, inside the chamber 6, to a second predetermined pressure P2 equal to the high pressure desired in order to send the coating material into the mold, S2 denoting the internal cross-sectional area of the chamber 6. This second pressure P2 is greater than the first pressure P0 under which the components A, B are injected into the chamber 6. The second pressure P2 is, for example, of the order of 70 MPa (700 bar).

Above the injection duct 14, that is to say beyond this duct in relation to the open end 7 of the chamber, the chamber 6 is extended by a coaxial cylindrical channel segment 43 having substantially the same internal cross section as the chamber 6. There exists, however, between the wall of the channel segment 43 and the periphery 39 of the piston, a clearance slightly greater than that existing between the wall of the chamber 6 and the periphery 39 of the piston, which makes it possible to apply a lubricant against the periphery 39 of the piston in order to promote its sliding in the channel composed of the segment 43 and of the chamber 6. For this purpose, orifices 44, 45 are made in the wall of the channel segment 43 in order to circulate a lubricant over the periphery 39 of the piston 38, as indicated diagrammatically by the arrows G and H in FIG. 1.

The operation of the above device will now be described, which will show the characteristics of the method according to the invention.

At the moment when the article 1 has been shaped in the mold 2, 3 and when the heat treatment is finished, the device is in the state represented in FIG. 1. The piston 38 is in its lower position and the needle 32 in its blocking position.

The jack 42 is then operated so that it moves the piston 38 as far as its upper position, which produces a vacuum in the chamber 6. Next, the jack 33 is operated so that it moves the needle 32 as far as its retraction position. The device is then in the state represented in FIG. 2. The material of the coating C is injected into the chamber 6 via the injection duct 14 under the first pressure P0, as illustrated by the jet 50 represented in FIG. 2.

The mixing of the two components A, B of the coating material takes place during this injection step. With the blocking needle 32 having been retracted, the metering pumps 27, 28 and the orifices 21, 22 form two opposite fluxes respectively containing the two components A, B under the first pressure P0. These two pressurized fluxes converge with each other and collide in countercurrent in a zone situated in the injection duct 14, which mixes the components A, B. The mixture thus formed is pushed by the pressure P0 through the duct 14 as far as the chamber 6. Since the injection duct 14 is transverse to the direction D of sliding of the piston 38 in the chamber 6, the jet of pressurized material 50 strikes the internal wall of the chamber 6 facing the injection duct 14 substantially perpendicularly, which further improves the mixing of the two components A, B.

During the step of injecting the coating material into the chamber 6, the metering pumps 27, 28 measure the flow rates of the injected components A, B. When the desired volumes of the two components A, B have been injected, the jack 33 is operated in order to push the needle 32 as far as its position of blocking the injection duct 14. These volumes are chosen so that the level N of the coating material C in the chamber 6 at the end of the injection step remains lower than that of the injection duct 14 (FIG. 3). Any risk of the material C flowing back into the injection duct 14 during the subsequent movement of the piston 38 is thus avoided.

With the duct 14 having been blocked, the jack 42 is operated so that it moves the piston 38 towards its lower position. The force F2 applied by the jack 42 to the piston 38 is adjusted in order to correspond, inside the chamber 6, to the high pressure P2 desired for sending the coating material into the mold.

Figure 4:
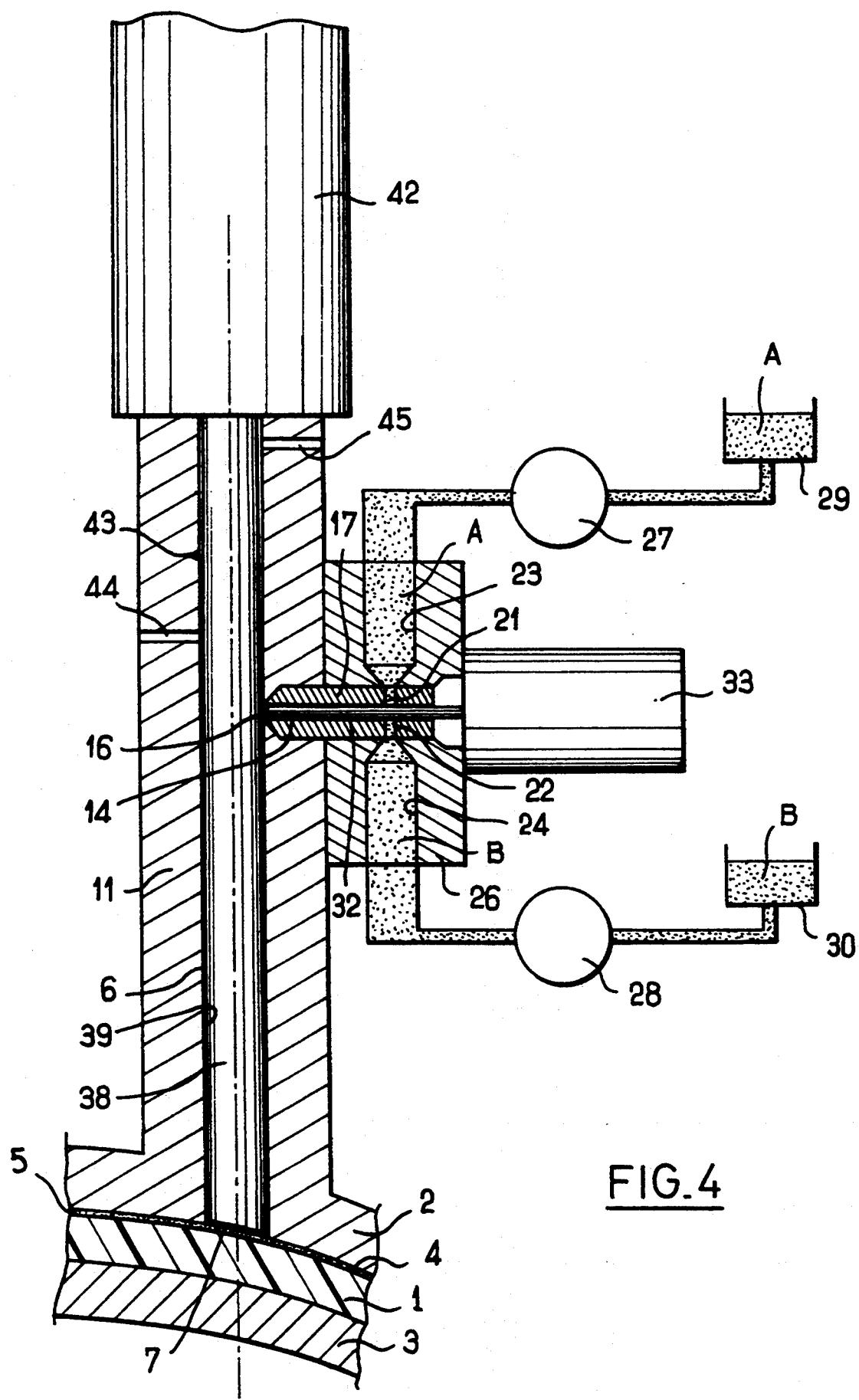

At the end of the downward movement of the piston 38, the device is in the state represented in FIG. 4. The material has entered the mold and has formed a coating 5 which is uniformly distributed on the surface 4 of the article 1.

The method and the device according to the invention have the advantage that only the chamber 6 must withstand the very high pressure P2 (of the order of 700 bar) used to send the material of the coating forcibly between the article 1 and the mold 2, 3. The injection means 13 need only withstand lower pressures P0 (of the order of 150 bar), in contrast to the injection means used according to U.S. Pat. No. 4,668,460. It is thus possible to use lighter and less expensive elements for making the injection means 13, or alternatively to increase the penetration pressures without increasing the weight of or complicating the injection means. Furthermore, the conditions of safety around the installation are improved.

With the mixing of the components A, B taking place during their injection into the chamber 6, time is saved over the known methods in which a mixing step must be performed previously, without substantially increasing the cost of the equipment required. The method according to the invention thus improves the cost-effectiveness of the equipment.

Although the invention has been described with reference to a preferred embodiment, it will be understood that this example is not limiting and that various modifications may be made thereto without departing from the scope of the invention.

Thus, the number of components of the coating material may be greater than two. A corresponding number of orifices is then arranged around the injection duct in order to converge fluxes containing the various components. The device may also be used in the case of a single-component material, by providing a single orifice emerging in the injection duct.

We claim:

1. A device for sending a coating material (C) under high pressure into an openable mold (2, 3) which is completely closed and is filled with moldable material, comprising a chamber (6) having one end (7) open towards the inside of the mold and injection means (13) for injecting the coating material (C) into the chamber (6), these injection means including an injection duct (14) emerging in the chamber (6), and which furthermore comprises a piston (38) which can move in the chamber (6) between a first position in which the piston blocks the open end (7) of the chamber and the second position beyond the injection duct (14) in relation to the open end (7) of the chamber, wherein the injection means (13) injects the coating material (C) into the chamber (6) under a first pressure (P0), and wherein means (42) for actuating the piston are provided in order to move the piston (38) in the direction going from said second position to said first position with a force (F2) corresponding, inside the chamber (6), to a second pressure (P2) which is greater than said first pressure (P0) and with the mold completely closed, said injection means (13) comprising means (32, 33) for blocking the injection duct (14), said means for blocking the injection duct comprising a needle (32) sliding with substantially zero clearance in the injection duct (14), and an actuator (33) controlling the movement of the needle (32).

2. A device for sending a coating material (C) under high pressure into an openable mold (2, 3) which is completely closed and is filled with moldable material, comprising a chamber (6) having one end (7) open towards the inside of the mold and injection means (13) for injecting the coating material (C) into the chamber (6), these injection means including an injection duct (14) emerging in the chamber (6), and which furthermore comprises a piston (38) which can move in the chamber (6) between a first position in which the piston blocks the open end (7) of the chamber and the second position beyond the injection duct (14) in relation to the open end (7) of the chamber, wherein the injection means (13) injects the coating material (C) into the chamber (6) under a first pressure (P0), and wherein means (42) for actuating the piston are provided in order to move the piston (38) in the direction going from said second position to said first position with a force (F2) corresponding, inside the chamber (6), to a second pressure (P2) which is greater than said first pressure (P0) and with the mold completely closed, said coating material (C) consisting of a mixture of at least two components (A, B), said injection means (13) comprising means (21, 27; 22, 28) for forming several converging fluxes respectively containing the components (A, B) of the material (C) under said first pressure (P0), said means for forming said converging fluxes comprising orifices (21, 22) emerging in the injection duct (14), and pumping means (27, 28) for delivering the components (A, B) under said first pressure (P0) through the orifices (21, 22), said injection means (13) comprising means for blocking the injection duct comprising a needle (32) sliding with substantially zero clearance in the injection duct (14) between a position in which the needle (32) blocks both the orifices (21, 22) and one end (16) of the injection duct which is open towards the chamber (6), and a position beyond the orifices (21, 22) in relation to the open end (16) of the injection duct.

* * * * *